May 18, 1937.  F. STREICH  2,080,584

DOUGH TWISTING MACHINE

Filed Aug. 8, 1936  3 Sheets-Sheet 1

Inventor:
Frank Streich.
by Charles O. Hurvey
his Atty.

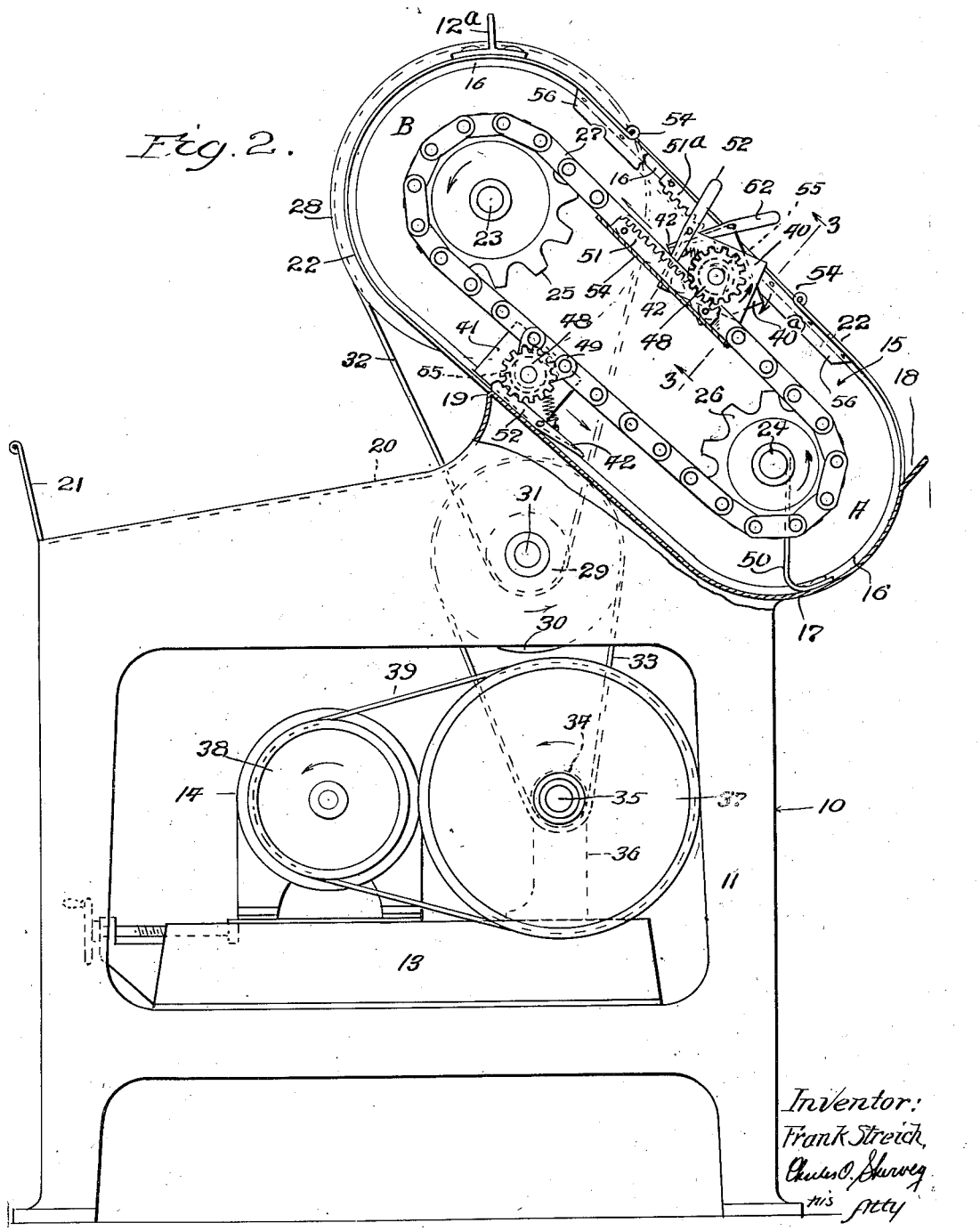

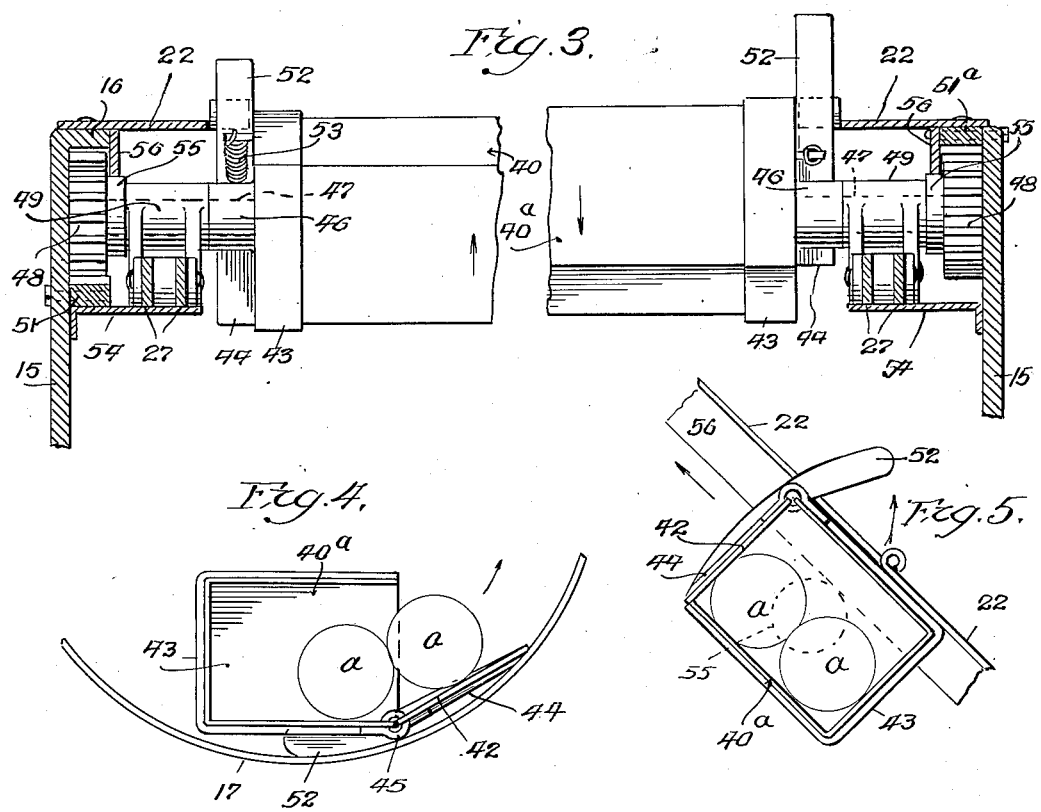
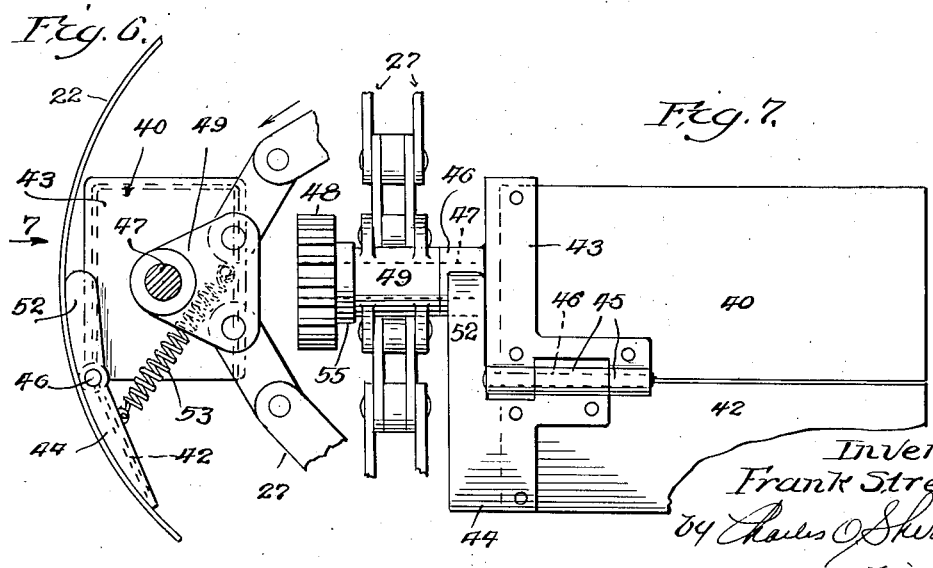

Patented May 18, 1937

2,080,584

UNITED STATES PATENT OFFICE 2,080,584

DOUGH TWISTING MACHINE

Frank Streich, Chicago, Ill., assignor of one-third to Caleb H. Canby, Jr., and one-third to H. Hoyt Thompson, both of Chicago, Ill.

Application August 8, 1936, Serial No. 94,921

13 Claims. (Cl. 107—8)

This invention relates to dough twisting machines, and its principal object is to provide an improved machine having mechanism for twisting together two or more molded rolls of dough, preparatory to being placed in a pan for baking a loaf of bread.

In the manufacture of bread by machinery and in order to obtain a fine texture and as close a grain as possible in the baked loaf, it has been found that by twisting together two or more molded rolls of dough before placing the mass in a baking pan that such result can be readily obtained.

In preparing the dough by machinery, it is customary to round up lumps of dough and thereafter mold or roll out the lumps of dough into the form of elongated rolls, this latter operation being done in a machine known as a "Molder", after which the rolls are twisted together before placing them in the baking pan. Heretofore the twisting has been done manually or sometimes with mechanism that has proven to be not entirely satisfactory.

Another object of the present invention is to provide one or more pairs of oppositely disposed dough twisting buckets, into which two or more molded rolls of dough are deposited from the molding machine, and mechanism for propelling the buckets from a receiving station to a discharge station, and mechanism operating during such transit, to rotate the buckets of each pair in opposite directions, thereby twisting the rolls of dough together.

Another object is to provide means for propelling the pairs of dough twisting buckets through an orbit from a receiving station to a discharge station, together with other mechanism for rotating the buckets of each pair in opposite directions while moving from the receiving station to the discharge station.

Another object is to provide oppositely disposed dough twisting buckets, each having an open end, and an open side through which open side the rolls of dough are deposited in the bucket and each bucket having a lid which is open at the receiving station and at the discharge station and is held closed while the buckets are traveling from the receiving station to the discharge station, together with means for rotating the buckets of each pair in opposite directions, whereby to twist the rolls of dough therein.

Other objects and advantages will appear in the course of this specification, and with all of said objects and advantages in view, this invention consists in the several novel features hereinafter fully set forth and claimed.

An embodiment of the invention is clearly illustrated in the accompanying drawings, in which:

Fig. 2 is a side elevation of the machine, with the upper part of one side frame member broken away, and the trough being shown in section, the line of section being indicated at 2—2 in Fig. 1;

Fig. 3 is a detail, vertical, cross-section, partly broken away, and taken on the line 3—3 in Fig. 2;

Fig. 4 is a diagrammatic view, in side elevation, illustrating one of the buckets at the receiving station and looking at the open end of the bucket;

Fig. 5 is a view, similar to Fig. 4, but showing the bucket in a position occupied when traveling from the receiving station toward the discharge station;

Fig. 6 is a fragmental detail side elevation, showing one of the buckets in a position occupied just after discharging the twisted rolls therefrom; and Fig. 7 is a front elevation of the bucket and conveying mechanism seen in Fig. 6 and looking in the direction of the arrow 7.

Figure 1:
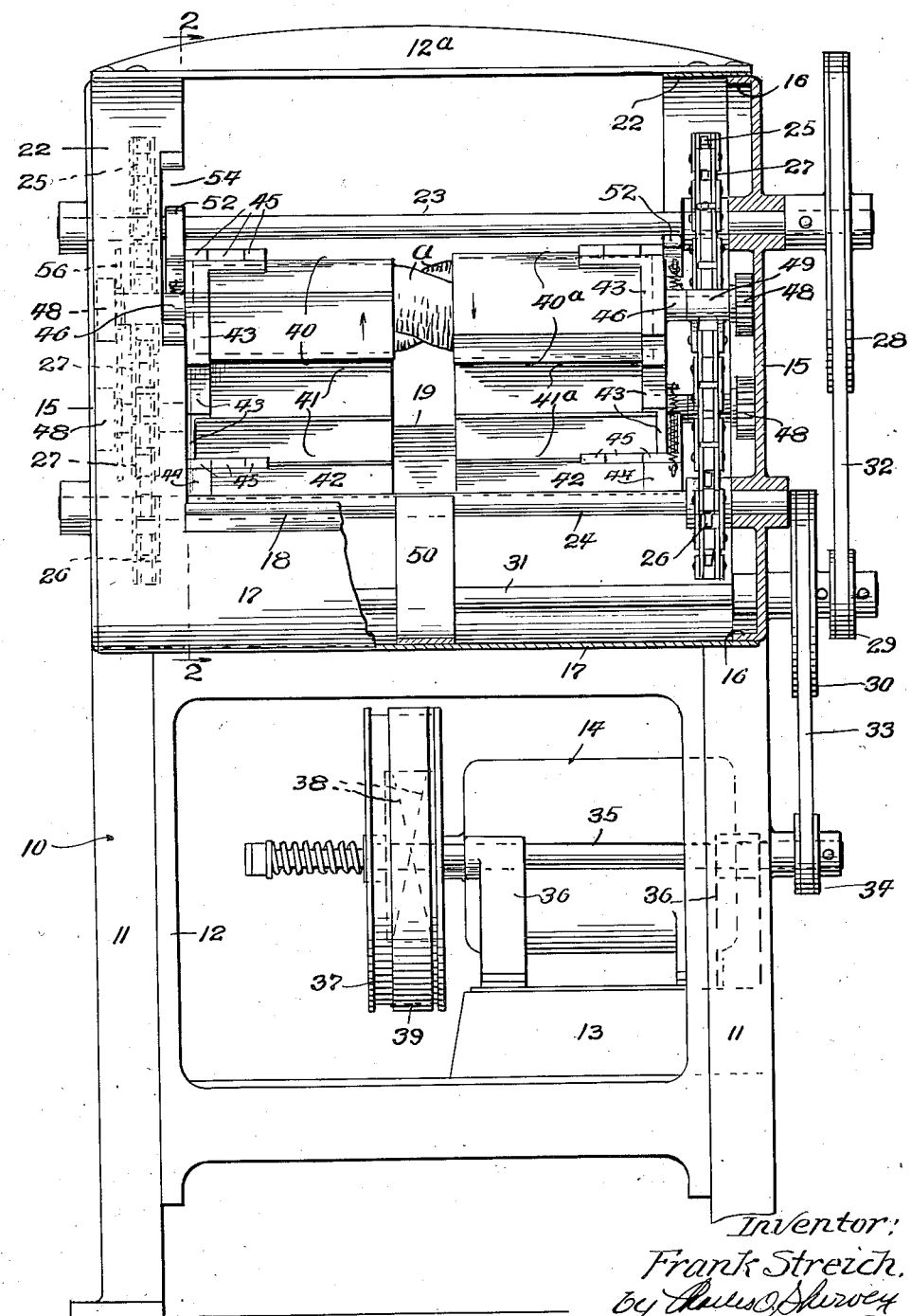
Fig. 1 is a rear elevation of a dough twisting machine, embodying a simple form of the invention, part of one side frame member and a certain receiving trough and casing being broken away and illustrated in section so as to expose parts to view that would otherwise be hidden.

Referring to said drawings, the reference character 10 designates the main supporting frame which desirably is composed of two side frame members 11, connected by cross frame members 12 and a cross bar 12ª. Supported by the frame is a platform 13, upon which is mounted an electric motor 14, which drives the operating mechanism of the machine.

The upper end of each side frame member is extended in the form of an elongated, flat, plate-like frame extension 15, having arcuate end edges connected by straight top and bottom edges, said edges being provided with inturned flanges 16. Connecting said flanges at the lower sides of said frame extensions is a sheet metal, concave, receiving trough 17 which terminates at one end in the form of a lip 18, and terminates at the other end at 19 (see Fig. 2), from which end an inclined table 20 extends to the front end of the machine, where an upstanding flange 21 is provided for preventing the twisted rolls from falling off the table. Extending upward from both ends of the trough and passing around the upper ends of both frame extensions, are strips of metal 22, which are riveted or otherwise fastened to the flanges 16 of the frame extensions 15. Said strips provide shields over the twister mechanism, and also serve as tracks, the purpose of which will be hereinafter more fully set forth.

Both ends of the frame extensions are of arcuate form, and journaled in said frame extensions, in lines co-axial with the centers of the arcuate end portions, are shafts 23, 24, upon which are rigidly mounted two pairs of sprocket wheels 25, 26, said sprocket wheels being located adjacent the inner sides of the frame extensions 15 and having endless or sprocket chains 27 trained around them. The shaft 23 is the driving shaft of the twisting mechanism, driven by means here shown as comprising a large belt pulley 28 on the shaft 23, small and large pulleys 29, 30, fast upon a shaft 31, journaled in the frame extensions, a belt 32 trained around the pulleys 28, 29 and a belt 33 trained around the pulley 30 and a pulley 34 fast on a shaft 35, journaled in brackets 36, mounted on the platform 13. Adjustable speed reducing gearing is provided between the motor and shaft 35, here shown as comprising a belt pulley 37, fast on the shaft 35, an expanding and contracting belt pulley 38 fast on the motor shaft and a belt 39 trained around the belt pulleys 37, 38. Any suitable form of power transmitting mechanism may be provided between the motor 14 and the drive shaft 23, and I do not, therefore, desire to limit myself to the exact form of power transmitting mechanism illustrated.

Carried by the sprocket chains 27, are pairs of dough twisting buckets 40, 40a, 41, 41a, two pairs being shown, although as many pairs may be employed as is found desirable, in accordance with the size of the machine and the rate of delivery of dough rolls from the molder. The buckets of each pair are set opposite each other and are open at their adjacent ends. Each bucket is also open at one side, as seen in Fig. 4, which side is arranged to be closed by a lid 42, hinged to the bucket at the open side thereof. Conveniently the outer end of each bucket is provided with a flanged head 43, which closes that end of the bucket and provides a substantial support therefor, the main portion of the bucket being desirably composed of sheet metal riveted or otherwise secured to the head. The buckets are of somewhat elongated form and are rectangular or non-circular in cross section.

Each lid is riveted or otherwise secured at one end to a re-enforcement plate 44 (see Fig. 7) and the hinge connection between the bucket and lid is formed by providing hinge ears 45 on the head 43 and plate 44 connected by a pintle 46, as is best seen in Fig. 7.

From the head 43 of each bucket, at the central point thereof, projects a boss 46, in which is rigidly mounted a stub shaft 47, which carries upon its extremity a pinion 48. At equi-distant places along the sprocket chains, two oppositely disposed links, for each pair of buckets, are extended to form brackets 49 (see Fig. 6), in which the stub shafts 47 are rotatively mounted.

From the above it will be understood that each dough twister bucket is rotatively carried by one sprocket chain and that the axes of the stub shafts of each pair of buckets are in co-axial alignment with each other. Some space is left between the adjacent open ends of the buckets, as is clearly seen in Fig. 1, to facilitate the twisting action of the buckets on the rolls of dough. In this figure, parts of two partly twisted rolls of dough, a, are seen in the gap between the pair of buckets 40, 40a.

The receiving end of the dough twisting mechanism is indicated at, A, (Fig. 2) and the discharge end at, B. An upright post 50 is secured to the bottom of the trough, midway between its sides, and serves as a stop for the rolls of dough when they are delivered into the trough from the molding machine. The post 50 is made narrow enough for the buckets to pass on either side thereof.

Various forms of mechanism may be employed for rotating the buckets of each pair in opposite directions. In the simple form illustrated, two rack bars 51, 51a, are provided, with which the pinions 48 intermesh during their passage from the receiving end to the discharge end of the twister mechanism. The pinions of the buckets 40, 41 are adapted to intermesh with the rack bar 51, whereas the pinions on the opposite buckets 40a, 41a are adapted to intermesh with the rack bar 51a. The rack bar 51a is disposed above the pinions which intermesh with it, and the rack bar 51 is disposed below the pinions which mesh with it, whereby when the buckets are propelled from the receiving end to the discharge end of the twisting mechanism the pinions will roll along their respective rack bars and the pinions for the buckets on one side will be caused to rotate in one direction and the pinions for the buckets on the opposite side will be caused to rotate in the opposite direction.

The number of teeth on the pinions correspond with the number of teeth on the rack bars so that one complete revolution is imparted to each pinion and therewith the associated bucket during the time the pinions are intermeshed with the rack bars.

The re-enforcement plate 44 of each lid is provided with a lid operating arm 52 which extends along the side of the head of the bucket (see Figs. 6 and 7) and comprises part of the means for closing the lid at the proper time. A tension spring 53, connecting the lid with the bucket, (see Fig. 6) provides means for closing the lid when permitted. The arm 52 of each lid is arranged to ride along the track formed by the trough 17 and the strips 22, thereby holding the lid in open position against the tension of the spring 53. At places adjacent the ends of the rack bars 51, 51a, the strips 22 are cut away in line with the arms, as seen at 54 in Figs. 1 and 2, thereby leaving a gap in each strip through which the lid operating arms may swing out, thereby permitting the tension springs to close the lids. At the ends of the gaps formed in the strips 22 the latter are preferably curled upon themselves, as seen in Fig. 2, to provide smooth, rounded stops for the lid operating arms. From an inspection of Fig. 2 it will be seen that while the buckets are traveling between the discharge end and the receiving end, the lids are held open by the track and lid operating arms, and that when the buckets reach the gaps in the track the arms are free to leave the track and the tension springs then act to swing the lids shut.

Desirably tracks 54 are provided below the rack bars for the chains to rest upon while passing said rack bars. The tracks 54 may be fastened to the frame extensions 15, as seen in Fig. 3. Upon the stub shafts 47 are rollers 55 which run against other tracks 56, secured to the frame extensions. The tracks 54 and 56 serve to steady the motion of the sprocket chains, besides serving to prevent any vibration or unsteady movement of the buckets while being rotated.

In the operation of the machine, rolls of dough are delivered to the receiving end of the twisting mechanism in regular succession from a molding machine, and the twisting mechanism is timed so that each pair of buckets picks up two rolls of dough each time a pair of buckets passes through the receiving end of the twisting mechanism. Fig. 4 illustrates a bucket in the act of receiving two rolls of dough.

It will be observed from this figure that the free edge of the lid travels along the concave face of the trough and scoops up the rolls of dough therefrom so that they may readily enter the cavities of the buckets. The lids remain open until the buckets reach the position seen in Fig. 5, namely, a position just prior to the time that the pinions intermesh with the rack bars and at this place the lid operating arms are free to swing out through the gaps in the tracks 22, thereby permitting the springs to close the lids. The continued movement of the sprocket chains brings the pinions into mesh with the rack bars, as seen in Fig. 2, whereupon the two pinions of each pair of buckets are caused to rotate in opposite directions, thereby rotating the pair of buckets oppositely and twisting the dough therein. Each bucket is rotated through a complete circle by the rack bars, thereby returning it to a position in which its open side is again brought into the position seen in Fig. 5, and when the lid operating arms engage the tracks 22, at the upper end of the gaps in the tracks 22, the arms are again swung down, thereby opening the lids and holding them open while the arms run upon the track. Directly after the buckets pass the highest point of the chain and commence their descent, the twisted rolls of dough fall out of the buckets and lodge upon the table 20 and the attendant thereupon picks up the twisted rolls and places them in a baking pan. The buckets proceed down to the receiving end and again pick up rolls of dough and twist them as above set forth.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new and desire to secure by Letters Patent:

1. In a dough twisting machine, the combination of a pair of aligned oppositely disposed rotatory dough twisting elements, rotating upon a common axis, means to propel said elements through parallel orbits and means to rotate said dough twisting elements in opposite directions.

2. In a dough twisting machine, the combination of a pair of aligned oppositely disposed rotatory dough twisting buckets rotating upon a common axis, each bucket having a single cavity for receiving a plurality of rolls of dough, means to propel said buckets through parallel orbits and means to rotate said buckets in opposite directions.

3. In a dough twisting machine, the combination of a pair of aligned oppositely disposed rotatory dough twisting buckets rotating upon a common axis, each open at one end and at one side, and each provided with a lid hinged along a side edge of the open side, and adapted to open and close the open side, means to propel the buckets through parallel orbits, means to open and close the lids and means to rotate the buckets in opposite directions.

4. In a dough twisting machine, the combination of a pair of oppositely disposed, rotatory dough twisting buckets, each open at one end and at one side, and each provided with a lid hinged to the bucket at its open side, means to propel said buckets through parallel orbits from a receiving end to a discharge end, means to close said lids adjacent the receiving end, and means to open the lids at the discharge end, whereby to discharge the contents of the buckets, and means to rotate the buckets in opposite directions along the path traversed from the receiving end to the discharge end.

5. In a dough twisting machine, the combination of a pair of oppositely disposed, rotatory dough twisting buckets, each open at one end and at one side, and each provided with a lid at the open side, endless chains carrying said buckets and adapted to propel them through parallel orbits from a receiving end to a discharge end, means to close said lids adjacent the receiving end and to open them at the discharge end, and rack and pinion means to rotate the buckets in opposite directions while moving from the receiving end to the discharge end.

6. In a dough twisting machine, the combination of a pair of oppositely disposed, rotatory dough twisting buckets, each open at one end and at one side, and each provided with a lid at its open side, parallel endless chains, one for each bucket, upon which the bucket is rotatively mounted, said chains operating to propel the buckets through parallel orbits from a receiving end to a discharge end, means to open and close the lids, and rack and pinion mechanism to rotate said buckets in opposite directions between the receiving and discharge ends.

7. In a dough twisting machine, the combination of a pair of oppositely disposed, rotatory dough twisting buckets, each open at one end and at one side, and each provided with a lid at its open side, parallel endless chains, one for each bucket, upon which the bucket is rotatively mounted, said chains operating to propel the buckets through parallel orbits from a receiving end to a discharge end, a pinion carried by each bucket, rack bars between said receiving and discharge ends, one adapted to mesh with the teeth of one pinion at one side of the axis thereof and the other adapted to mesh with the teeth of the other pinion at the opposite side of the axis thereof, whereby to rotate the pinions and buckets in opposite directions, and means to close the lids during rotation of the buckets.

8. In a dough twisting machine, the combination of a pair of oppositely disposed, rotatory dough twisting buckets, each open at one end and at one side, and each provided with a lid at its open side, an endless chain for each bucket, upon which the bucket is rotatively mounted, said chains operating to propel the buckets through an orbit from a receiving end to a discharge end, a pinion carried by each bucket, rack bars, one associated with each pinion, and one being disposed above its associated pinion and one below its associated pinion, whereby when the pinions intermesh with the rack bars they are rotated in opposite directions, tracks having gaps therein adjacent said rack bars, lid operating arms running on said tracks, and springs to close said lids when the lid operating arms enter the gaps in the track.

9. In a dough twisting machine, the combination of a traveling, rotatory dough twisting bucket open at one end and at one side, a lid hinged to the open side of the bucket, a spring between said bucket and lid for closing the latter, a lid operating arm, and a track against which said lid operating arm bears, said track having a gap therein through which the arm is released from the track.

10. In a dough twisting machine, the combination of spaced side frame members, each having an elongated frame extension formed with arcuate ends, shafts journaled in said frame extensions co-axially with the axes of the arcuate ends, sprocket wheels on said shafts, parallel sprocket chains trained around said sprocket wheels, pairs of twister buckets carried by said sprocket chains, one bucket of each pair being carried by one of said sprocket chains, means to open and close the buckets, and means to rotate the buckets of each pair in opposite directions.

11. In a dough twisting machine, the combination of a frame having spaced elongated frame extensions formed with arcuate ends, a concave receiving trough at one end of the frame extensions, a table below the other end of the frame extensions, a pair of oppositely disposed dough twister buckets, each having an open side and a lid for opening and closing said side, means to propel said buckets along said concave receiving trough with the lids open and through parallel orbits with the lids closed and means to rotate said buckets in opposite directions.

12. In a dough twisting machine, the combination of two oppositely disposed frame members having two straight edges and arcuate end edges, tracks extending around said edges, said tracks having oppositely disposed gaps, pairs of oppositely disposed dough twister buckets having lids hinged thereto, yieldable means to hold said lids closed, means to propel said buckets in an orbit along said tracks, means to rotate the buckets of each pair in opposite directions at the gaps in the tracks, and means extending from the lids traveling along said tracks and through the gaps therein and adapted to hold lids of said buckets open when traveling along the tracks.

13. In a dough twisting machine, the combination of an arcuate receiving trough, pairs of oppositely disposed dough twister buckets having hinged lids arranged to travel through said trough with the lids open and traveling in contact with the trough, means to close the lids, means to propel the buckets through parallel orbits, and means to rotate the buckets of each pair in opposite directions.

FRANK STREICH.